US010628414B2

United States Patent
Desai et al.

(10) Patent No.: US 10,628,414 B2
(45) Date of Patent: *Apr. 21, 2020

(54) DISTRIBUTED PROCESSING OF A SEARCH QUERY WITH DISTRIBUTED POSTING LISTS

(71) Applicant: International Business Machines Corporation, Armonk, NY (US)

(72) Inventors: Rajesh M. Desai, San Jose, CA (US); Alon S. Housfater, Vaughan (CA); Roger C. Raphael, San Jose, CA (US); Paul S. Taylor, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 965 days.

This patent is subject to a terminal disclaimer.

(21) Appl. No.: 15/188,805

(22) Filed: Jun. 21, 2016

(65) Prior Publication Data
US 2016/0378823 A1 Dec. 29, 2016

Related U.S. Application Data

(63) Continuation of application No. 14/750,945, filed on Jun. 25, 2015, now Pat. No. 10,402,400.

(51) Int. Cl.
*G06F 16/00* (2019.01)
*G06F 16/2453* (2019.01)
(Continued)

(52) U.S. Cl.
CPC ...... *G06F 16/2453* (2019.01); *G06F 16/2471* (2019.01); *G06F 16/24578* (2019.01); *G06F 16/84* (2019.01)

(58) Field of Classification Search
CPC ........................................ G06F 16/84
See application file for complete search history.

(56) References Cited

U.S. PATENT DOCUMENTS 7,966,332 B2 6/2011 Altevogt et al.
8,108,340 B2 1/2012 Marin
(Continued)

OTHER PUBLICATIONS

You, et al., "GPU-based spatial indexing and query processing using R-Trees." Proceedings of the 2nd ACM International Workshop on Analytics for Big Geospatial Data 2013, pp. 8.
(Continued)

*Primary Examiner* — Ajith Jacob
(74) *Attorney, Agent, or Firm* — David W. Victor; Knorad, Raynes, Davda and Victor LLP

(57) ABSTRACT

Provided are a computer program product, system, and method for distributed processing of a query with distributed posting lists. A dispatch map has entries, wherein each entry identifies one of a plurality of terms in a dictionary, wherein for each of the terms there is a posting list identifying zero or more objects including the term, wherein at least one of the dispatch map entries indicate at least one distributed processing element including the posting list for the term. The dispatch map is used to dispatch sub-expressions comprising portions of a query to distributed processing elements having the posting lists for terms in the sub-expressions, wherein the distributed processing elements distributed the sub-expressions execute the sub-expressions on the posting lists for the terms in the sub-expression.

9 Claims, 8 Drawing Sheets

(51) Int. Cl.
*G06F 16/2458* (2019.01)
*G06F 16/2457* (2019.01)
*G06F 16/84* (2019.01)

(56) References Cited

U.S. PATENT DOCUMENTS

| | | |
|---|---|---|
| 8,244,700 B2 | 8/2012 | Permandla et al. |
| 8,666,994 B2 | 3/2014 | Ogilvy et al. |
| 8,838,576 B2 | 9/2014 | Junqueira et al. |
| 2005/0055364 A1 | 3/2005 | Frieder et al. |
| 2008/0133473 A1 | 6/2008 | Broder et al. |
| 2008/0306949 A1 | 12/2008 | Hoernkvist et al. |
| 2009/0164437 A1 | 6/2009 | Torbjornsen |
| 2011/0173177 A1 | 7/2011 | Junqueira et al. |
| 2014/0214838 A1 | 7/2014 | Hendrey |
| 2014/0297611 A1 | 10/2014 | Abbour et al. |
| 2016/0378837 A1 | 12/2016 | Desai et al. |

OTHER PUBLICATIONS

S. Ding et al., "Using Graphics Processors for High Performance IR Query Processing", ACM, Apr. 20-24, 2009, Madrid, Spain, pp. 10.

L. Gosink, et al., "Bin-Hash Indexing: A Parallel GPU-Based Method for Fast Query Processing", IDAV Institute for Data Analysis and Visualization, pp. 5, [online] [retrieved Feb. 21, 2019] http://www.idav.ucdavis.edu/research/projects/BIN_HASH_QUERY.

Notice of Allowance, dated Jan. 2, 2019, for U.S. Appl. No. 14/750,945, filed Jun. 25, 2015, invented by R.M. Desai et al., Total 8 pages.

Arroyuelo, et al. "Distributed Search Based on Self-Indexed Compressed Text." dated 2012, Information Processing & Management 48.5, pp. 819-827.

US Patent Application, dated Jun. 25, 2015, for U.S. Appl. No. 14/750,945 (54.128) filed Jun. 25, 2015, invented by Rajesh M. Desai et al., Total 34 pages.

Preliminary Amendment, dated Jun. 21, 2016, for U.S. Appl. No. 14/750,945 (54.128) filed Jun. 25, 2015, invented by Rajesh M. Desai et al., Total 7 pages.

List of Related Applications, pp. 2, dated Jun. 21, 2016.

Final Office Action 1 for U.S. Appl. No. 14/750,945, dated Mar. 26, 2018, 11 pp. [54.128 (FOA1)].

Response to Final Office Action 1 for U.S. Appl. No. 14/750,945, dated Jun. 13, 2018, 12 pp. [54.128 (RFOA1)].

Office Action, dated Oct. 5, 2017, for U.S. Appl. No. 14/750,945 (54.128) filed Jun. 25, 2015, invented by Rajesh M. Desai et al., Total 20 pages.

Response to Office Action, dated Jan. 5, 2018, for U.S. Appl. No. 14/750,945 (54.128) filed Jun. 25, 2015, invented by Rajesh M. Desai et al., Total 12 pages.

Response to Notice of Allowance, dated Mar. 28, 2019, for U.S. Appl. No. 14/750,945 (54.128), filed Jun. 25, 2015, invented by R.M. Desai et al., Total 7 pages.

Notice of Allowance, dated Apr. 25, 2019, for U.S. Appl. No. 14/750,945 (54.128), filed Jun. 25, 2015, invented by R.M. Desai et al., Total 11 pages.

US Patent Application, dated Jun. 13, 2019, for U.S. Appl. No. 16/440,971 (54.128C2) filed Jun. 13, 2019, invented by Rajesh M. Desai et al., Total 34 pages.

Preliminary Amendment, dated Jun. 13, 2019, for U.S. Appl. No. 16/440,971 (54.128C2) filed Jun. 13, 2019, invented by Rajesh M. Desai et al., Total 8 pages.

List of Patents and Applications Treated as Related, dated Jul. 15, 2019, Total 2 pages.

Posting List Entry

Term Dispatch Map Entry

DISTRIBUTED PROCESSING OF A SEARCH QUERY WITH DISTRIBUTED POSTING LISTS

BACKGROUND OF THE INVENTION

1. Field of the Invention

The present invention relates to a computer program product, system, and method for distributed processing of a query with distributed posting lists.

2. Description of the Related Art

A typical search query may be represented as a query expression tree of terms in some arbitrary combination of conjunction or disjunction with explicit or implicit precedence. Sub-trees of the query expression tree, referred to herein as sub-expressions, may be separately and parallel processed, and the results of the separately processed sub-expressions correctly combined as dictated by the query expression tree to obtain the final query result. The sub-expressions may be sent to separate processors, in some cases standard processing units referred to as Central Processing Units or in other cases referred to as General Purpose Graphical Processing Units (GPUs) or a combination of both, to independently and parallel process the sub-expressions. The GPUs or CPUs may host an entire search index of terms that may be included in the queries. However, limited memory sizes of the GPUs may limit the ability of GPUs to process sub-expressions when the term index becomes substantially large, such as may occur with enterprise applications where there are numerous documents whose terms are indexed.

There is a need in the art for improved techniques for managing the dispatching of sub-expressions to remote distributed processing elements, such as CPUs or GPUs, to process.

SUMMARY

Provided are a computer program product, system, and method for distributed processing of a query with distributed posting lists. A dispatch map has entries, wherein each entry identifies one of a plurality of terms in a dictionary, wherein for each of the terms there is a posting list identifying zero or more objects including the term, wherein at least one of the dispatch map entries indicate at least one distributed processing element including the posting list for the term. The dispatch map is used to dispatch sub-expressions comprising portions of a query to distributed processing elements having the posting lists for terms in the sub-expressions, wherein the distributed processing elements distributed the sub-expressions execute the sub-expressions on the posting lists for the terms in the sub-expression.

DETAILED DESCRIPTION

Processing a query or search with distributed processing elements requires management of the bandwidth usage between a central processing element and the distributed processing elements. For instance, a distributed processing element may not have sufficient memory to hold a very large scale index of posting lists for search terms. Further, coherence of the posting lists for the search terms must be maintained between the management processing element managing operations and the distributed processing elements.

Described embodiments provide techniques to determine how to distribute posting lists for terms in a dictionary of that may be found in objects to the different posting lists based on access frequency and other access factors for the terms, such as re-write, run-on, etc. In this way, different of the distributed processing elements may store posting lists for different subsets of terms. A dispatch map has entries for terms in a dictionary where the dispatch map entries indicate zero or more distributed posting elements including the posting lists for the terms. Different distributed processing elements may store different subsets of posting lists for different terms distributed to the distributed processing elements.

Multiple queries may be batched and then processed at once to generate expression trees for each query, where each sub-expression comprises a portion of the expression tree of each tree. Each sub-expression includes at least one operator and a plurality of the terms in the dictionary. Sub-expressions for the multiple queries are queued for processing in a sub-expression queue. If one sub-expression is located in multiple of the expression trees for multiple queries, only one instance of the common sub-expression is processed to optimize processing. If the dispatch map identifies one of the distributed processing elements as having the terms in one of the sub-expressions, then the sub-expression is dispatched to that distributed processing element to execute the sub-expression on the posting lists for the terms in the sub-expression. The result sets for the sub-expressions of the query, including result sets received from distributed processing elements are combined to form the final query result set. Further, a result set returned for a common sub-expression found in multiple query expression trees is used in forming the results for the multiple queries having the common-subexpression. In this way, the single result set for the common sub-expression is shared with the multiple queries expression trees having that common sub-expression.

With the described embodiments, the overall processing of multiple primary queries arriving at the system remains transparent to the user thereby providing overall better throughput of the query system in general.

Figure 1:
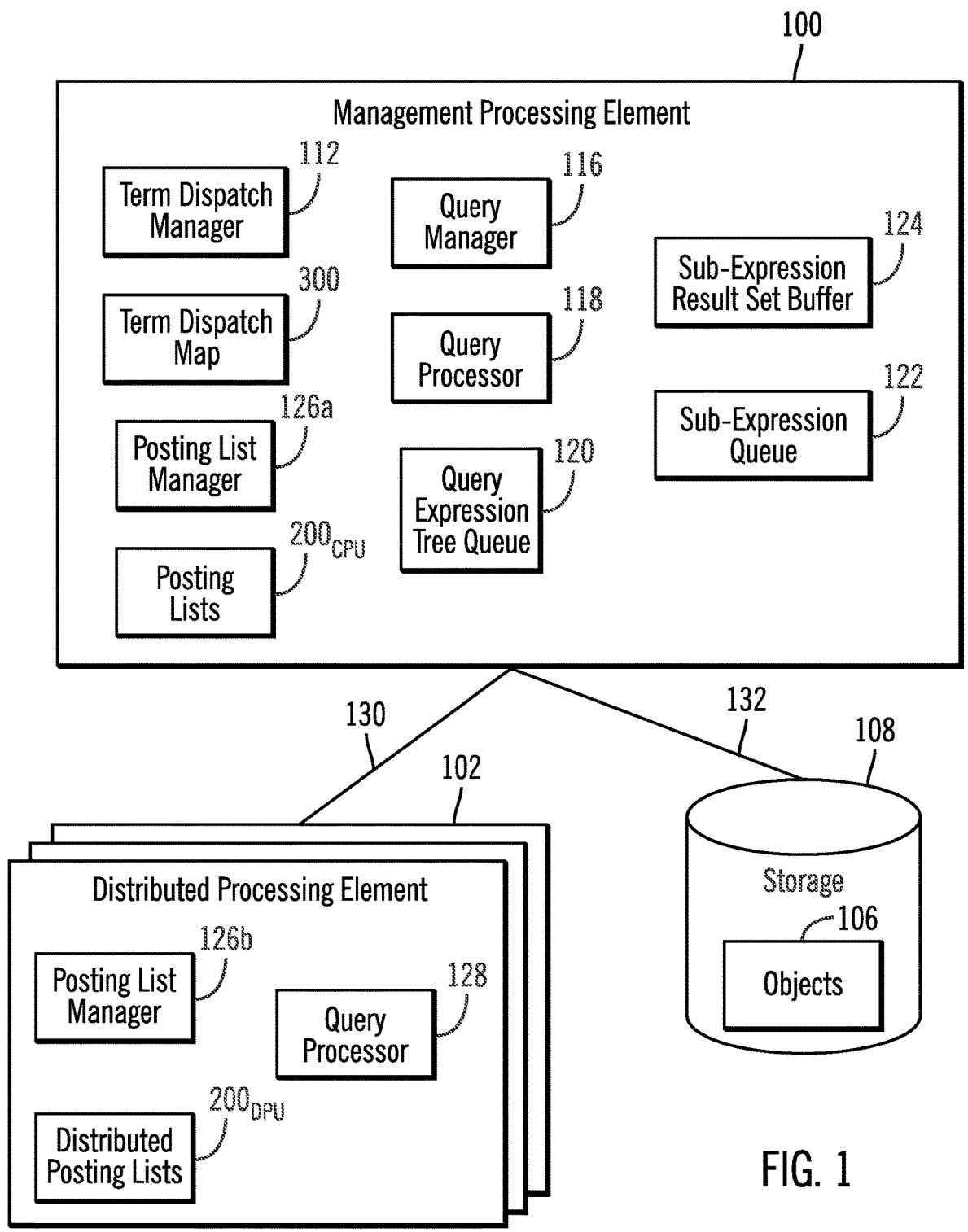
FIG. 1 illustrates an embodiment of a distributed query processing environment.

FIG. 1 illustrates an embodiment of a query processing environment including a management processing element 100 and a plurality of distributed processing elements 102. The management processing element 100 maintains posting lists $200_{CPU}$ for terms in a dictionary comprising a set of all terms in a corpus of objects 106 that include the terms. The objects 106 may comprise documents, records, database records, files, programs, data structures, etc. The objects 106 may be stored in a storage 108. The posting lists $200_{CPU}$, managed by a posting list manager 126a, provide for each term in the dictionary a posting list identifying objects 106 that include that term. The management processing element 100 further maintains a term dispatch map 300, managed by a term dispatch manager 112 module, which has information on terms whose posting lists have been distributed to the processing elements 102. Each distributed processing element 102 has distributed posting lists $200_{DPU}$ of the posting lists for terms that have been distributed to that distributed processing element 102.

The management processing element 100 has a query manager 116 to manage the execution of queries received from external hosts (not shown) or applications executing in the processing elements 100, 102. A query processor 118 executes a query and generates a query expression tree queue 120 that represents the terms and operators of a query in tree form, where the query expression tree may include query fragments or sub-expressions. The sub-expressions may comprise terms and operators of a query that may be independently executed to determine sub-expression result sets, which may later be combined to obtain the final query result set. In one embodiment, the sub-expressions may comprise a sub-expression with a three tuple of (posting list 1, posting list 2, operator), where the distributed processing element 102 would subject the two posting lists of the three tuple to the indicated operated to execute the sub-expression. The query manager 116 may add sub-expressions of queries to a sub-expression queue 122 from which the sub-expressions are dispatched to one of the distributed processing elements 102 or the local query processor 118 to execute. Result sets having objects resulting from executing the sub-expressions, by the management processing element 100 or the distributed processing elements 102, are stored in a sub-expression result set buffer 124.

In described embodiments, the management processing element 100 may batch and concurrently process multiple queries to generate query expression trees for each of the batched queries. Sub-expressions from the query expression queues may be added to the sub-expression queue 122 such that if a common sub-expression is found in multiple query expression trees for multiple batched queries, the common sub-expression is added once to the sub-expression queue 122 so the common sub-expression is processed once and the results shared with multiple of the query expression trees having the common sub-expression.

Each of the distributed processing elements 102 includes a posting list manager 126b to add terms and their posting lists sent from the term dispatch manager 112 to the distributed posting lists $200_{DPU}$ and remove from the distributed posting lists $200_{DPU}$ posting lists for terms that are not to be maintained at the distributed processing element 102. A query processor 128 executes sub-expressions dispatched by the query manager 116.

The management processing element 100 and the distributed processing elements 102 communicate over an interface 130, which may comprise a computer bus interface, e.g., a Peripheral Component Interconnect (PCI) interface, when the processing elements 100 and 102 are on the same motherboard; a network interface when the processing elements 100, 102 are distributed on different physical and virtual machines in a network; a processor bus on an integrated circuit when the processing elements 100 and 102 comprise different cores on an integrated circuit substrate; and a software interface when the processing elements 100 and 102 comprise virtual machines. The processing elements 100, 102 may comprise virtual and/or physical processing units. In one embodiment, the management processing element comprises a central processing unit (CPU) type system, such as a scalar processor, and the distributed processing elements 102 comprise Graphical Processing Units (GPUs), such as vector processor. In an alternative embodiment, the distributed processing elements 102 may include CPU class processors.

With the described embodiments, the distributed processing elements 102 may process multiple arbitrary queries to optimally process the queries by processing common sub-expressions across a window of incoming queries. The distributed processing elements 102 may comprise single instruction, multiple data (SIMD) processors, such as GPUs, which comprise a class of parallel computers in Flynn's taxonomy to allow the query subexpressions to be processed with data level parallelism. With such embodiments, the distributed processing elements 102 GPU's can achieve a very high degree of data parallelism and is restricted by the number of SIMD threads and physical memory resident on the distributed processing elements. Having sub-expressions processed at different data processing elements 102 with data level parallelism, such as in GPU implementations, provides sub-expression parallelism over the corpus of incoming queries. In alternative embodiments, other types of parallel processors may be used.

The storage 108 may comprise one or more storage devices known in the art, such as interconnected storage devices, where the storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The storage devices in the storage 108 may be organized as a Redundant Array of Independent Disks (RAID) array, a Just of Bunch of Disks (JBOD) array, and other arrangements.

The storage 108 may further store the posting lists $200_{CPU}$, the term dispatch map 300, sub-expression result buffer 124 and other information maintained by the management processing element 100. The management processing element 100 may communicate with the storage 108 over a suitable data communication interface 132 known in the art.

Figure 2:
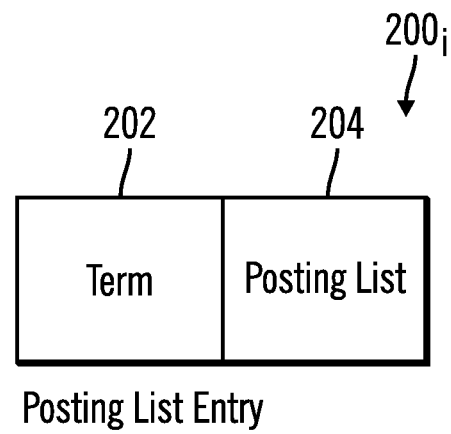
FIG. 2 illustrates an embodiment of a posting list.

FIG. 2 illustrates an embodiment of an instance of a posting list entry $200_i$ in the posting lists $200_{CPU}$, $200_{DPU}$ for a term in the dictionary, and includes a term 202 and a posting list 204 of objects 106 that include the term 202 or a reference to the term 202.

Figure 3:
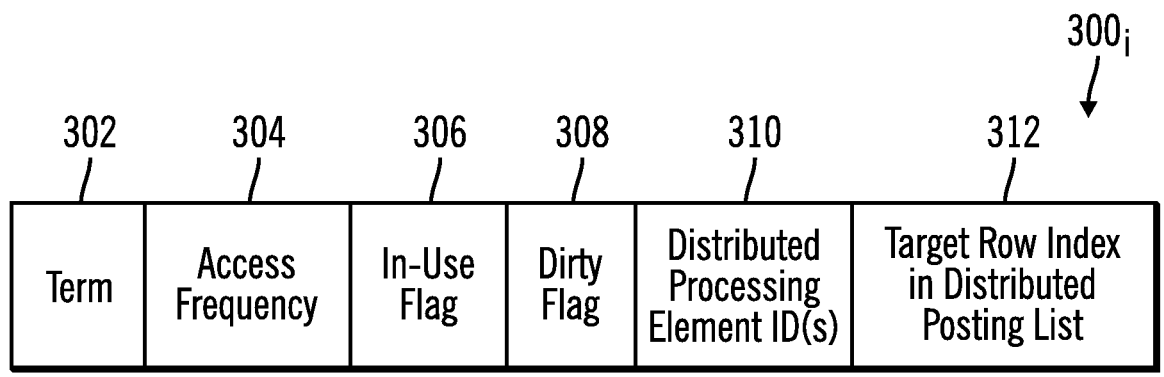
FIG. 3 illustrates an embodiment of a term dispatch map entry.

FIG. 3 illustrates an embodiment of an instance of an entry $300_i$ in the term dispatch map 300, and includes the term 302; an access frequency 304 of the term 302; an in-use flag 306 indicating whether one of the distributed processing elements 102 has been dispatched a sub-expression including the term 302; a dirty flag 308 indicating whether the posting list 204 for the term 302 has changed, e.g., objects 106 have been removed or deleted; a distributed processing element identifier (ID) 310 identifying zero or more processing elements 102 dispatched the posting list 204 for the term 202; and a target row index in the distributed posting list 312 having the dispatched posting list for the term 302.

Figure 4:
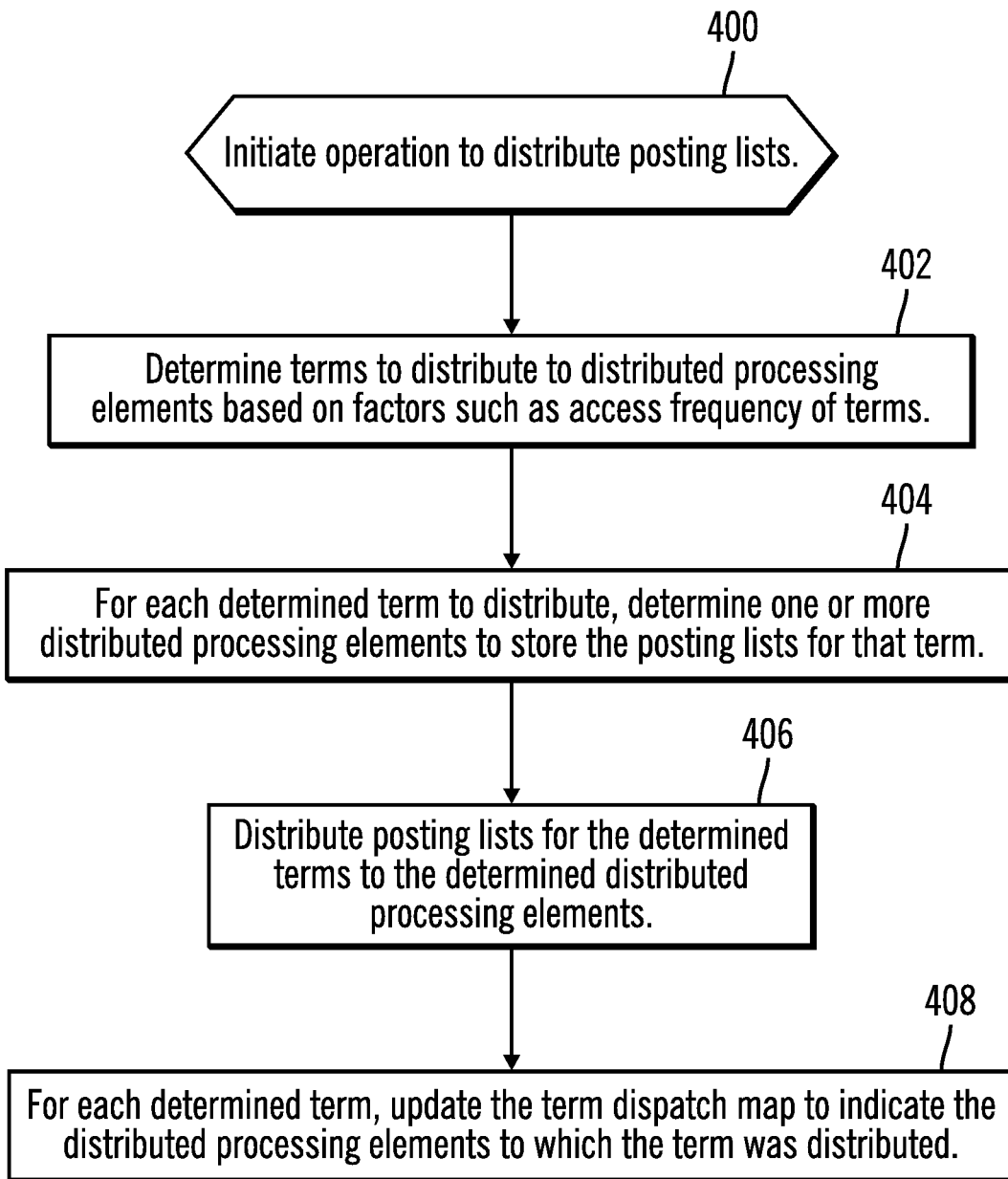
FIG. 4 illustrates an embodiment of operations to distribute posting lists to processing elements.

FIG. 4 illustrates operations performed by the term dispatch manager 112 (or other components), executed by the management processing element 100, to distribute posting lists for terms to the processing units 102. Upon initiating (at block 400) the dispatch operations, the term dispatch manager 112 determines (at block 402) terms to distribute to distributed processing elements 102 based on factors, such as the access frequency 304 of the terms. For instance, terms that are accessed frequently, may be selected to have their posting lists 204 distributed to one or more distributed processing elements 102. Further, to the extent that a group of terms are frequently found together in sub-expressions of queries, the term dispatch manager 112 may tend to have those group of terms distributed to the same distributed processing element 102 to increase the likelihood that the posting lists for all terms of a sub-expression are located on a single distributed processing element 102. As part of having a group of terms frequently accessed together distributed to one distributed processing elements 102, the term dispatch manager 112 may remove the posting lists for those terms in the group that are located on other distributed processing elements 102. Other techniques may be used to determine the terms whose posting lists should be distributed to the distributed processing elements 102.

For each determined term to distribute, the term dispatch manager 112 determines (at block 404) one or more distributed processing elements 102 to store the posting lists for that term. The term dispatch manager 112 may use load balancing techniques to distribute posting lists among the distributed processing elements 102 so as to balance their sub-expression processing workload. The posting lists 204 for the determined terms are distributed (at block 406) to the determined distributed processing elements. For each determined term whose posting list is distributed, the term dispatch manager 112 updates (at block 408) the term dispatch map 300 to indicate the one or more distributed processing elements 102 to which the term was distributed, such as by updating distributed processing element ID 310 field in the entries $300_i$ for the terms having their posting lists distributed.

In one embodiment, after system initialization, no posting lists may be distributed. However, as queries are processed and the access frequency of terms determined, the term dispatch manager 112 may begin distributing posting lists to distributed processing elements 102.

Figure 5:
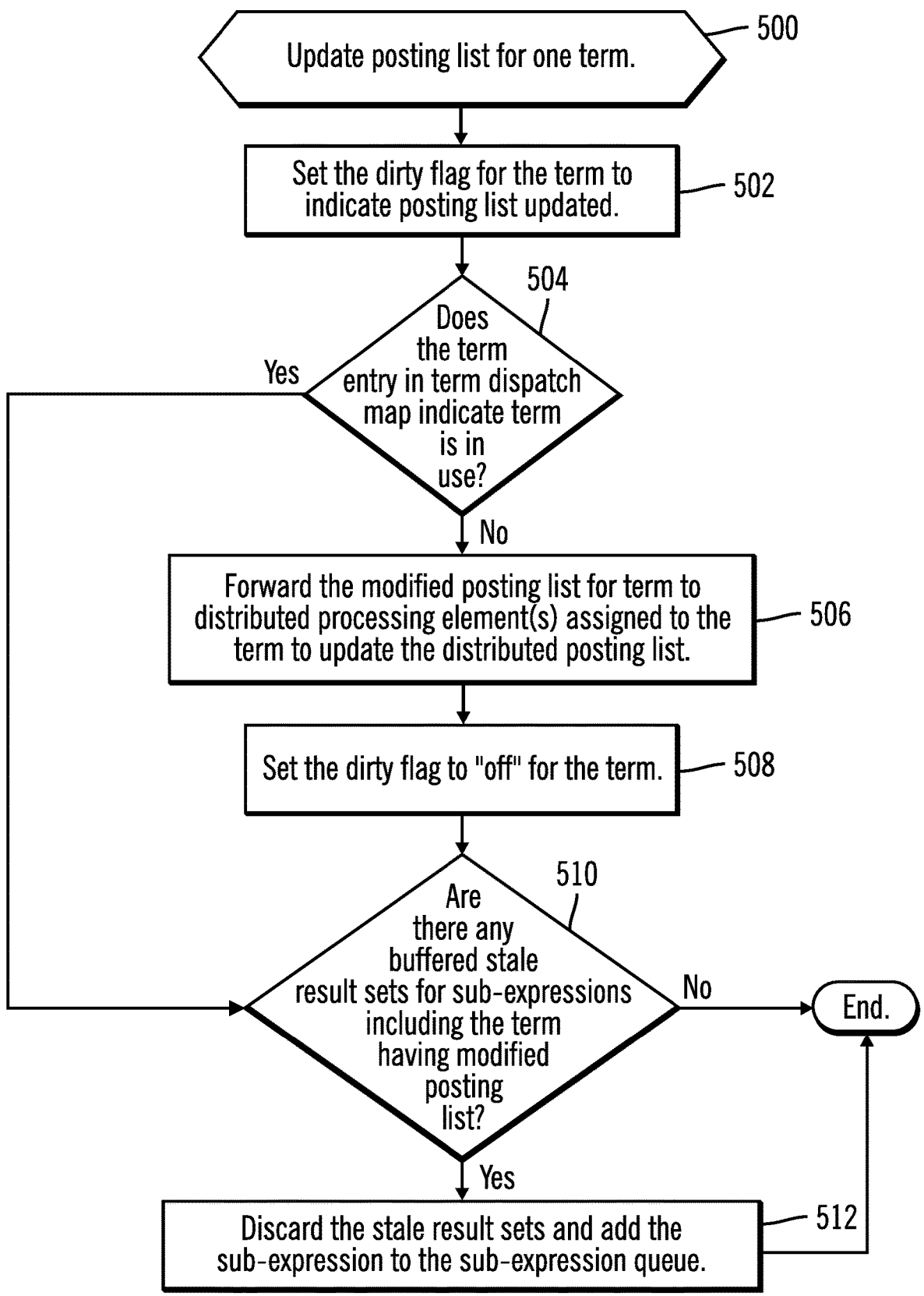
FIG. 5 illustrates an embodiment of operations to update a posting list for a term.

FIG. 5 illustrates an embodiment of operations performed by the posting list manager 126a and the term dispatch manager 112 (or other components), executed by the management processing element 100, to manage a modification to a posting list 204 in the posting lists $200_{CPU}$ for a term 202. Upon the posting list manager 126a updating (at block 500) a posting list 204 in the posting lists $200_{CPU}$ for a term, the term dispatch manager 112 is called to set (at block 502) the dirty flag 308 for the term to indicate that the posting list 204 for the term was modified, e.g., objects are added or removed from the posting list 204. If (at block 504) the term entry $300_i$ in the term dispatch map 300 indicates the term is not in use, e.g., the in-use flag 306 is not set, then the modified posting list 204 for the term is forwarded (at block 506) to the one or more distributed processing elements 310 for the term to update the distributed posting list $200_{DPU}$. After the updated posting list 204 is distributed, the dirty flag 308 may be set (at block 508) to "off" for the term.

After forwarding the updated posting list 204 or if the term dispatch map 300 indicates the term is in use, e.g., the in-use flag 306 is set, then if (at block 510) there are any buffered stale result sets in the sub-expression result set buffer 124 for sub-expressions including the term having the modified posting list 204, then the stale result sets are discarded (at block 512) from the buffer 124 and the sub-expression having the term with the modified posting list is added back to the sub-expression queue 122 to be processed again so that the updated posting lists $200_{DPU}$ are used. If (at block 510) there are no stale result sets for sub-expressions having the term with the modified posting list, then control ends.

With the operations of FIG. 5, updating the objects indicated in a posting list 204 for a term 202 results in the updated posting list being forwarded to a distributed processing element 102 to which the posting list was distributed if the posting list is not in use, and results in removal of any sub-expression result sets whose object results may be stale due to the modification of a posting list for any term in the sub-expression. The operations of FIG. 5 provide coherency of the posting lists between the management processing element posting list $200_{CPU}$ and the distributed posting lists $200_{DPU}$.

Figure 6:
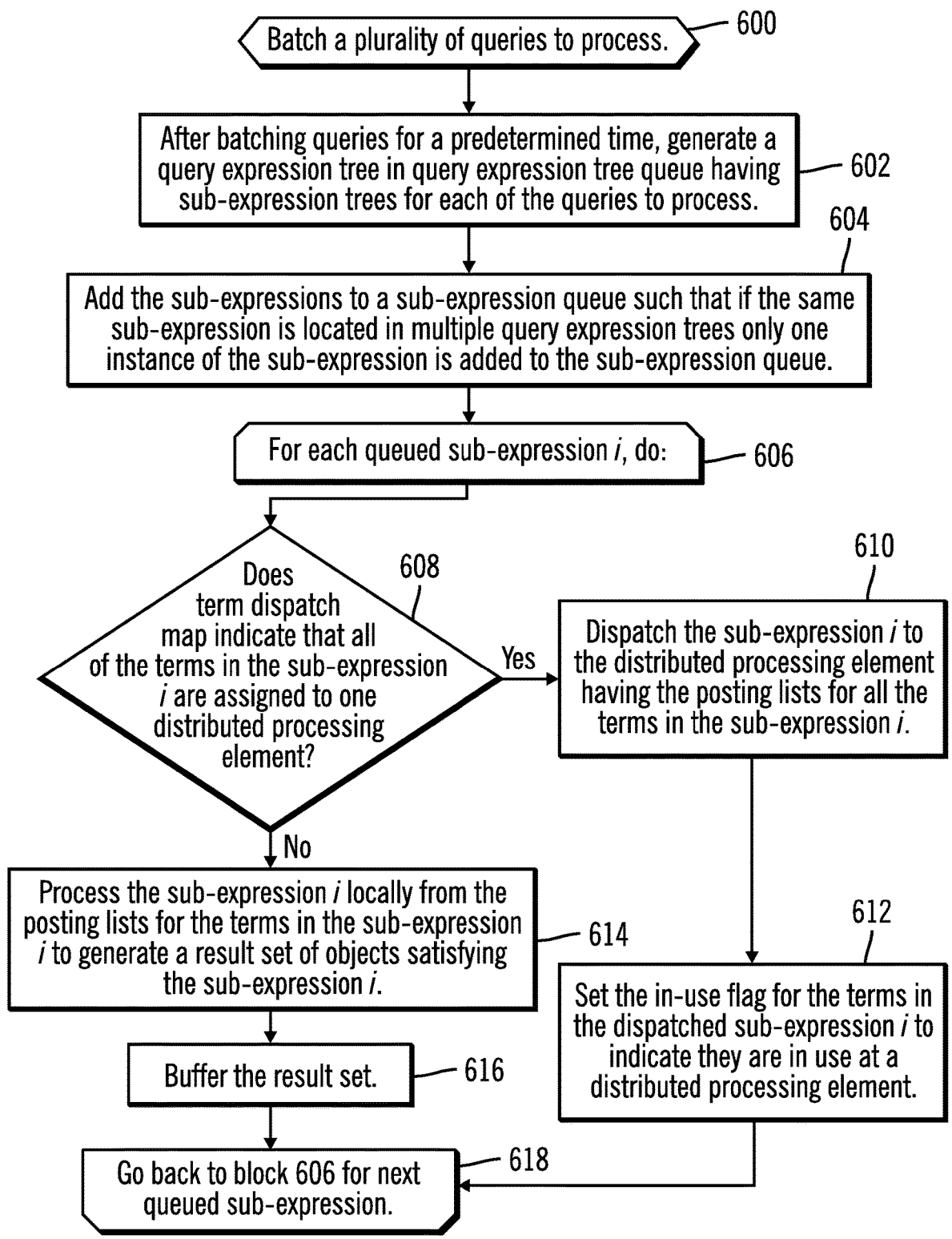
FIG. 6 illustrates an embodiment of operations to process a query.

FIG. 6 illustrates an embodiment of operations performed by the query manager 116, query processor 118, and/or term dispatch manager 112 (or other components), executed by the management processing element 100, to process queries received from a one or more host applications. Upon batching a plurality of queries (at block 600), after a predetermined time for batching queries or after batching a predetermined number of queries, the query manager 116 generates a query expression tree from the operands and search terms in the query in the query expression tree queue 120 for each of the batched queries being processed together. The query expression tree queue 120 may comprise a forest of sub-trees comprising the sub-expressions. Sub-expressions or query fragments from the query expression trees are added (at block 604) to the sub-expression queue 122, such that if a common sub-expression is located in multiple query expression trees, only one instance of the common sub-expression is added to the sub-expression queue 112, so the common sub-expression is processed just once. Each sub-expression includes at least one operand and search terms that form an independently executable fragment of the query tree. The query may be down converted to Boolean expressions on the terms having operations such as difference, union, and intersection. The Boolean expression may further be converted to a binary expression tree. The sub-expression when executed may perform one or more operations on the terms resulting in an array of objects from the posting lists subject to the operands of the sub-expression. Common sub-expressions in the sub-expression queue 122 are found in multiple queries, and different queries may have a same sub-expression (same terms and operands), thus a result set from one processed common sub-expression may be used in processing multiple query expression trees for multiple queries.

For each queued sub-expression i in the sub-expression queue 122, a loop (at blocks 606-620) of operations 608-616 is performed. At block 608, the query manager 116 determines whether the term dispatch map 300 indicates that all of the terms in the sub-expression i are assigned to one distributed processing element 102. If so, the query manager 116 dispatches (at block 610) the sub-expression i to the distributed processing element 102 having the posting lists for all the terms in the sub-expression i, such as a distributed processing element 102 identified in the distributed processing element field 310 of all the term entries $300_i$ in the term dispatch map 300. The in-use flag 306 for the terms in the dispatched sub-expression i are set (at block 612) to indicate they are in use at a distributed processing element 102. If (at block 608) not all the terms are assigned to one distributed processing element 102, then the query manager 116 invokes the local query processor 118 to process (at block 614) the sub-expression i by subjecting the posting lists of the terms in the sub-expression to the operands to generate a result set array of objects satisfying the sub-expression i. The result set is buffered (at block 616) in the sub-expression result set buffer 124. After dispatching the sub-expression i (at block 612) for buffering (at block 616) the locally processed sub-expression i, control proceeds (at block 618) back to block 606 until all the queued sub-expressions are processed.

With the described operations of FIG. 6, each of the queued sub-expressions may be processed by one of the processing elements having posting lists for all the terms in the query or by the local query processor 118. The sub-expression result sets are buffered in the sub-expression result set buffer 124 for use when processing the query. A result set for a common-sub expression found in multiple query expression trees is processed and returned once, and used for multiple query expression trees.

Figure 7:
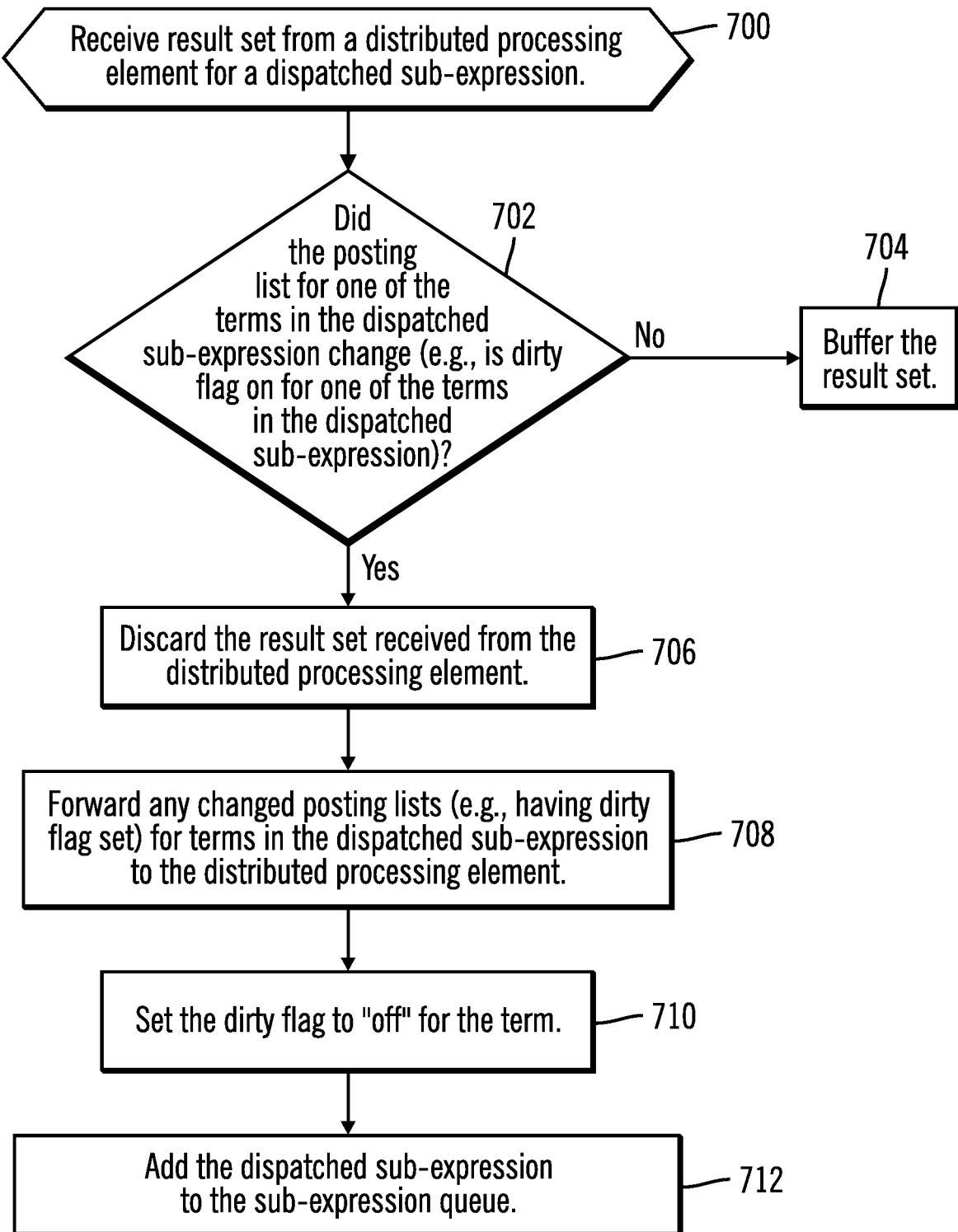
FIG. 7 illustrates an embodiment of operations to process a result set for a dispatched sub-expression from one of the distributed processing elements.

FIG. 7 illustrates an embodiment of operations performed by the query manager 116, term dispatch manager 112 and/or other components to process a sub-expression result set received from one of the distributed processing elements 102. Upon receiving (at block 700) a result from a distributed processing element 102 for a dispatched sub-expression, the term dispatch manager 112 (or some other component) determines (at block 702) whether the posting list in the posting lists $200_{CPU}$ for one of the terms in the dispatched sub-expression has changed, e.g., objects have been added or removed. In one embodiment, the posting list has changed when the dirty flag 308 for the term is set. If (at block 702) no posting list for the terms in the dispatched sub-expression have changed, the result set for the dispatched sub-expression are buffered in the sub-expression result set buffer 124, because all the posting lists used by the distributed processing element 102 are current. If (at block 702) one of the posting lists of the terms in the dispatched sub-expression have changed while the distributed processing element 102 was processing the sub-expression, then the received result set is discarded (at block 706) as stale or outdated posting lists may have been used. Any changed posting lists for the terms of the sub-expression are forwarded (at block 708) to the distributed processing element providing the result set, such as posting lists for terms in the sub-expression having the dirty flag 308 set. The dirty flag 308 for the terms whose posting lists are forwarded may then be set (at block 710) to "off" and the dispatched sub-expression whose result set is discarded may be added (at block 716) back the sub-expression queue 122 to be executed with the current posting lists for the terms.

In an alternative embodiment, instead of adding back the sub-expression to the sub-expression queue 122 whose result set was discarded, the local query processor 118 may immediately execute the sub-expression to determine the result set.

Figure 8:
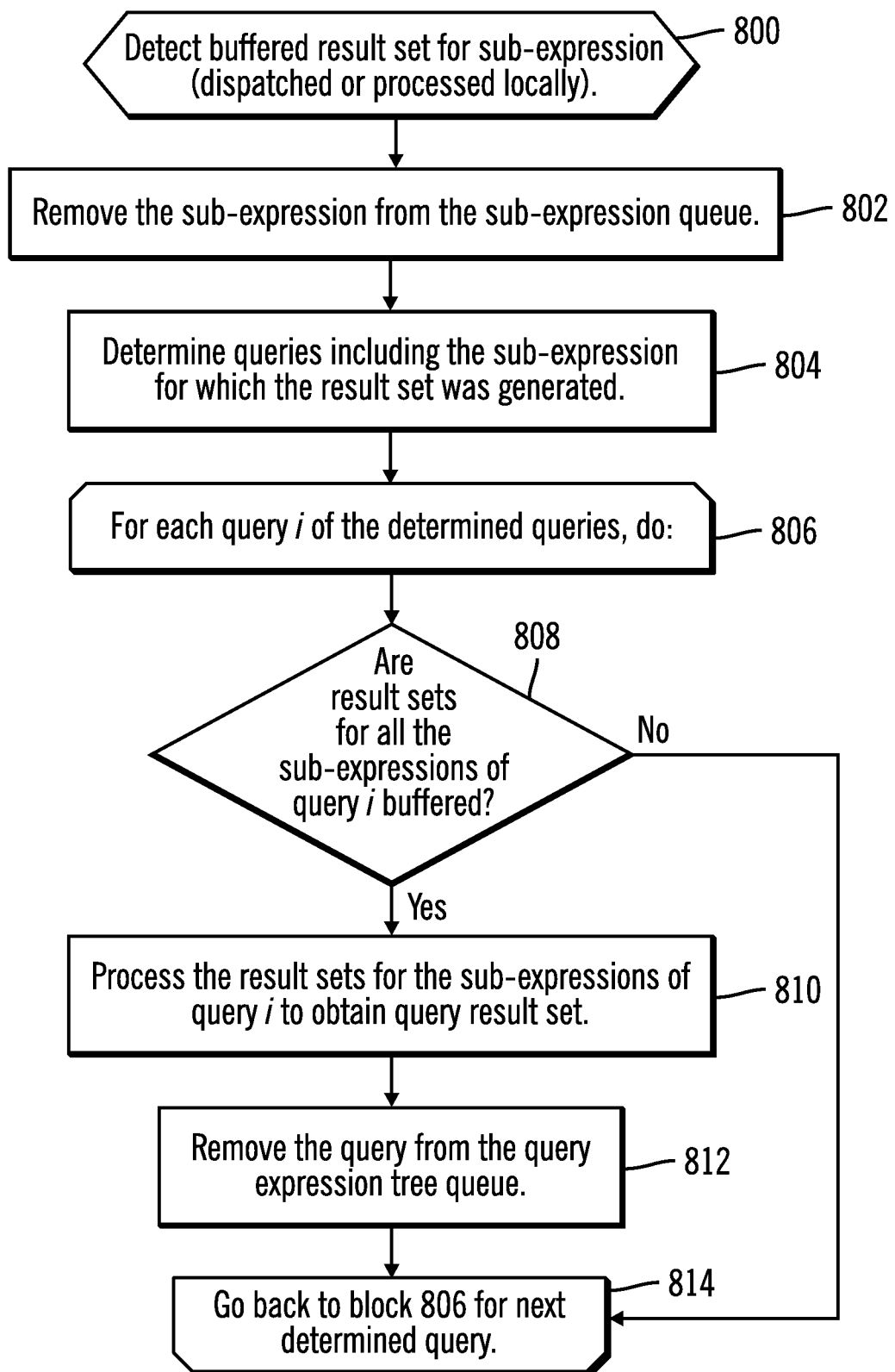
FIG. 8 illustrates an embodiment of operations to process queries when a result set is buffered.

FIG. 8 illustrates an embodiment of operations performed by the query manager 116 (or some other component in the management processing element 100), executed by the management processing element 100, to process the sub-expressions of a query to generate a final query result. Upon detecting (at block 800) that a result set has been buffered for a processed sub-expression, by being processed locally by the query processor 118 or processed remotely by a distributed processing element 102, the sub-expression for which the result set is buffered is removed (at block 802) from the sub-expression queue 122. A determination is then made of queries including the sub-expression for which the buffered result set was generated. A loop of operations (at blocks 806-814) is performed for each of the determined queries having the sub-expression whose result set was just buffered. For determined query i, if (at block 808) the result sets for all the sub-expressions of query i are buffered in the sub query result set buffer 124, then the query manager 116 processes (at block 810) all the results sets for the sub-expressions of query i to generate a final query result set to return to query i. The query i may then be removed from the query expression tree queue 120. If (at block 808) not all result sets for the sub-expressions of query i are available or after obtaining the query result set (at block 812), control proceeds (at block 814) back to block 806 to process the next determined query if there are further determined queries to consider.

With the operations of FIG. 8, queued sub-expression result sets may be used in multiple queries if multiple queries include the same sub-expression in their query tree to optimize performance and reduce bandwidth between the management processing element 100 and processing elements 102. A sub-expression result set may be removed from the buffer 124 after there are no pending queries in the query queue 120 that would need the sub-expression result set.

In one embodiment, the management processing element 100 may invoke one thread for each query being processed to perform the operations of FIG. 6 for each received query. The distributed processing elements 102 may invoke one thread for each sub-expression being processed at the distributed processing element to process each received sub-expression.

In the described embodiment of FIG. 6 queries are batched then processed concurrently to generate multiple query expression trees. In an alternative embodiment, queries may not be batched and instead processed as they are received.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. Further, in certain embodiments, the program instructions may be implemented using specialized languages for programming accelerators such as Compute Unified Device Architecture (CUDA) and Open Computing Language (OpenCL) for GPUs and Verilog/VHSIC Hardware Description Language (VHDL)/OpenCL for Field Programmable Gate Arrays (FPGAs). The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a graphical processing unit, general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or storage unit of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
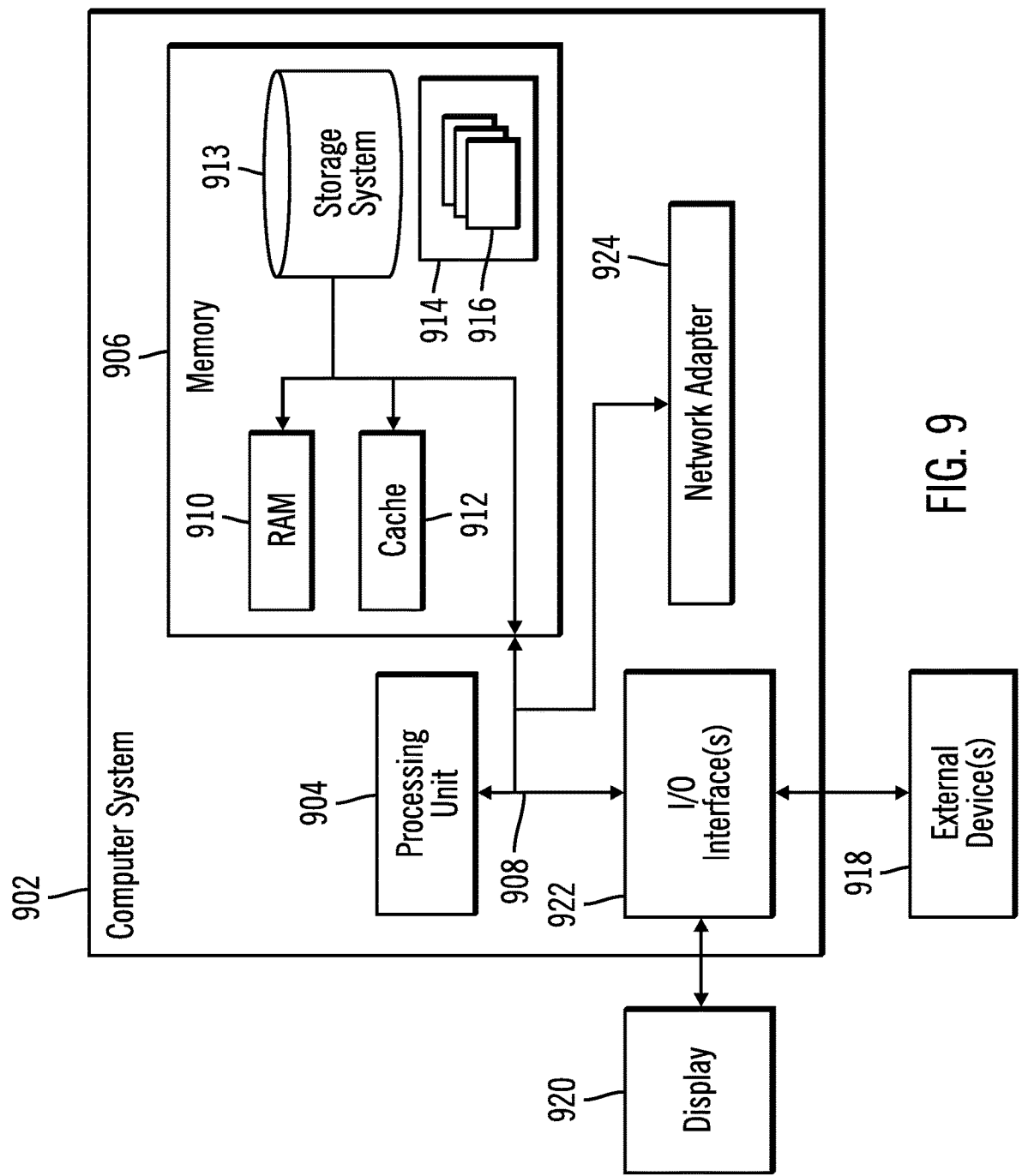
FIG. 9 illustrates a computing environment in which the components of FIG. 1 may be implemented.

The computational components of FIG. 1, including the hosts processing elements 100 and 102, may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The reference characters used herein, such as i, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for managing a posting list among a plurality of distributed processing elements, comprising:
   maintaining a dispatch map having entries, wherein each entry identifies one of a plurality of terms in a dictionary, wherein for each of the terms there is a posting list identifying zero or more objects including the term, wherein at least one of the dispatch map entries indicate at least one distributed processing element including the posting list for the term; and
   using the dispatch map to dispatch sub-expressions comprising portions of a query to distributed processing elements having posting lists for terms in the subexpressions, wherein the distributed processing elements distributed the sub-expressions execute the sub-expressions on the posting lists for the terms in the sub expressions.

2. The method of claim 1, wherein the operations further comprise:
   distributing terms and their posting lists to the distributed processing elements based on at least one factor comprising an access frequency of terms, wherein terms having a higher access frequency are distributed to the distributed processing elements.

3. The method of claim 1, wherein a management processing element maintains the dispatch map and dispatches a sub-expression, wherein the operations further comprise:
   determining from the dispatch map that the terms of one of the sub-expressions are not all maintained at one of the distributed processing elements; and
   processing a sub-expression at the management processing element in response to determining that the terms of the sub-expression are not all maintained at one of the distributed processing elements.

4. The method of claim 1, wherein each of the distributed processing elements includes a different subset of posting lists for different terms in the dictionary.

5. The method of claim 1, wherein the operations further comprise:
   batching a plurality of queries and generating sub-expressions for the batched queries, wherein a common sub-expression of the generated sub-expressions that is present in multiple queries being processed is dispatched only once to one of the distributed processing elements, and wherein a result set for the common-sub-expression is used in the multiple queries having the common sub-expression.

6. The method of claim 1, further comprising:
   processing result sets for the sub-expressions of the query, including a received result set, to generate a query result set to return for the query; and
   receiving a result set from a distributed processing element including indication of the objects returned from executing the query on the posting lists for the terms of a sub-expression.

7. The method of claim 1, further comprising:
   determining whether the posting list for one of the terms in a sub-expression for which the result set was received has changed while the sub-expression was being processed at a distributed processing element; and
   processing the sub-expression using a most recent versions of the posting lists for the terms in the sub-expression in response to determining that the posting lists for one of the terms in the sub-expression has changed.

8. The method of claim 1, further comprising:
   determining whether the posting lists for one of the terms has changed to produce a modified posting list; and
   forwarding the modified posting list to a distributed processing element identified in the dispatch map for the term having the modified posting list.

9. The method of claim 1, wherein the sub-expressions comprise a three tuple of two posting lists and an operand, wherein the distributed processing elements comprise graphical processing units that compute the sub expressions by subjecting the two posting lists to the operand.

\* \* \* \* \*